UNITED STATES PATENT OFFICE.

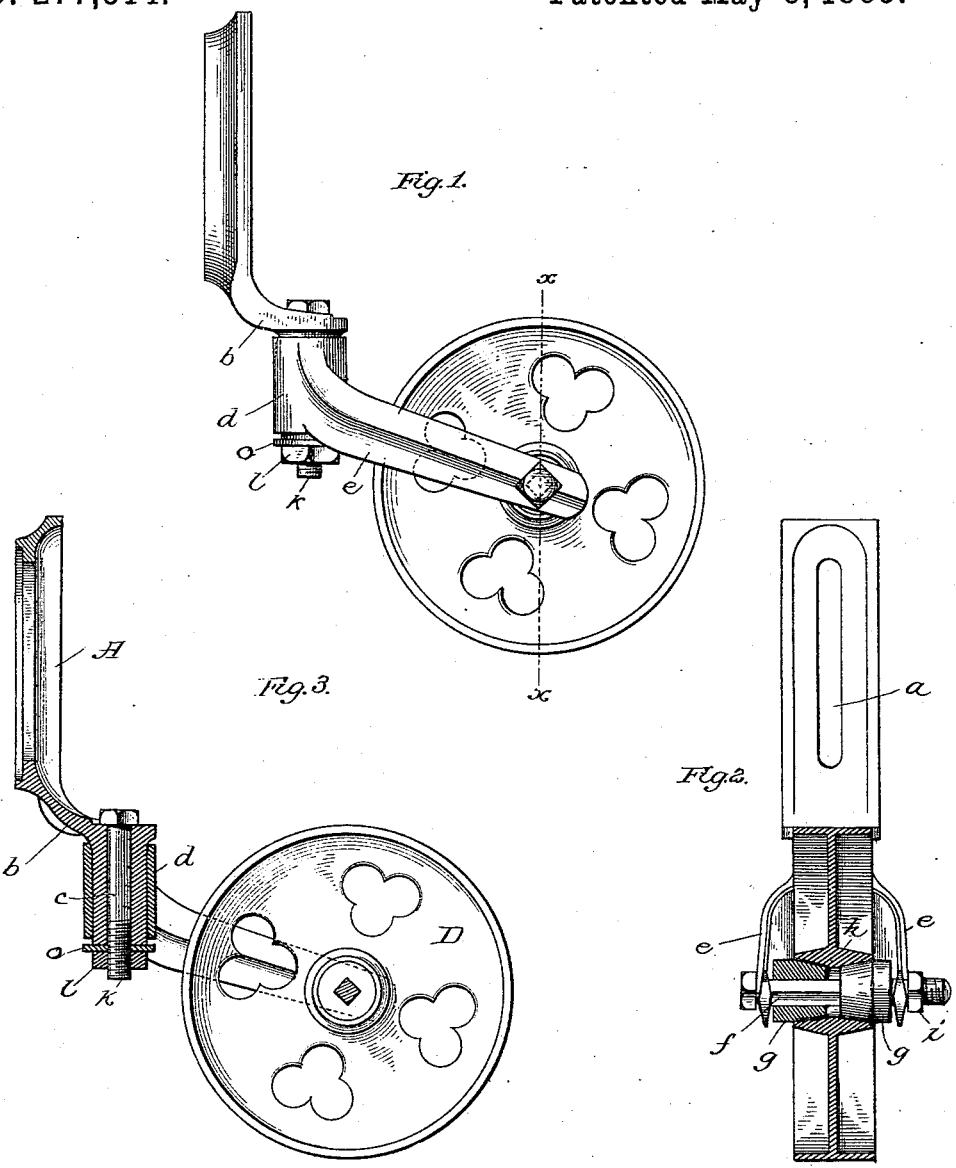

EDMUND D. MEAGHER, OF SOUTH BEND, INDIANA, ASSIGNOR TO THE ECONOMIST PLOW COMPANY, OF SAME PLACE.

PLOW.

SPECIFICATION forming part of Letters Patent No. 277,314, dated May 8, 1883.

Application filed November 21, 1882. (No model.)

*To all whom it may concern:*

Be it known that I, EDMUND D. MEAGHER, of South Bend, in the county of St. Joseph and State of Indiana, have invented a new and useful Improvement in Plows; and I do hereby declare that the following is a full, clear, and exact description of the same.

My invention relates to the gage-wheel of plows and the devices for connecting the same to the beam.

The object of my invention is to provide a novel means for adjustably attaching a gage-wheel to a plow-beam, and also to provide means for adjusting such gage-wheel upon its bearings to prevent it from running out of true, and in general to produce a more effective device than has hitherto been used.

The invention consists in the peculiar device for swiveling the gage-wheel standard to a bracket secured to the plow-beam.

In the accompanying drawings, Figure 1 shows a side elevation of my improved gage-wheel. Fig. 2 is a section on line $x$ $x$ of Fig. 1. Fig. 3 shows a central vertical section of the bearing and connection of frame and bracket.

In these figures, A represents the bracket, which is directly connected to the beam by bolt through slot $a$. This bracket has an offset, $b$, provided with a pintle, $c$. This pintle fits a socket, $d$, cast on the frame which carries the wheel D. The arms $e$ $e$, which, with the socket, form the frame, are nearly horizontal, making the structure substantially a caster-wheel. This frame I propose to form of malleable iron, with the arms $e$ $e$ made thin, so that they may be sprung or drawn inward for the purpose hereinafter explained. The special construction of the pivoting-joint between the frame and the bracket A is more clearly shown in Fig. 3. The socket and pintle are made of larger size than usual, and the pintle is formed with a longitudinal bore to receive the bolt $k$. I make the pintle $c$ a trifle longer than the shell of the socket, so that when the nut $l$ is turned on, the washer $o$ bears against the lower end of the pintle, and is pressed thereon instead of upon the lower end of the socket. By this construction the nut may be turned on to bind firmly without interfering with the freedom of motion of the pivoted parts.

The special construction of the bearings for the gage-wheel is shown in Fig. 2. The hub is coned outward from the center, and the bearing consists of two truncated cones, $g$ $g$, made of suitable hard wood boiled in oil, and adapted to fit into the hub and approach each other from opposite sides. A square or polygonal hole is made through these bearings axially to receive the bolt $f$, which also passes through square or polygonal holes in the ends of the arms $e$ $e$. A nut, $i$, holds the bolt in place. The two bearings $g$ $g$ are so proportioned to the bore of the hub that when first inserted they leave a space between their ends in the center of the hub. The wheel turns upon the wooden bearings, and as they roll they may be forced inward by turning up the nut $i$, which keeps the parts snugly fitted, so that the wheel turns accurately and is kept properly in the center, and no space is left for the admission of grit.

The bracket A is attached to the beam of the plow adjustably in any well-known manner, and the gage-wheel follows the lead of its bearing in the manner of an ordinary caster-wheel. This allows the wheel always to keep in line with the draft, whatever the direction of the beam, and there is no tendency to draw the plow out of line, as is the case with the ordinary rigidly-held gage-wheels. A further advantage arises in the working of my improved gage-wheel, in this respect: that when the wheel meets with small inequalities in the surface it tends to swing around them instead of riding over them, and thus avoids lifting the forward end of the beam and varying the depth of the cut.

It will be obvious that the wooden cones can be prepared in any suitable way other than that of being boiled in oil.

Having thus described my invention, what I claim is—

The combination of the standard A, having the cylindrical pintle $c$, the socket $d$, adapted to extend nearly but not quite to the lower end of the pintle, the screw-bolt $k$, and the nut $l$.

In testimony whereof I have signed my name to this specification in the presence of two subscribing witnesses.

EDMUND D. MEAGHER.

Witnesses:
JOHN M. CHAPMAN,
ADAM LITTLE.